US009069494B2

United States Patent
Kirby et al.

(10) Patent No.: US 9,069,494 B2
(45) Date of Patent: Jun. 30, 2015

(54) EVALUATING AND MANAGING IMAGE QUALITY PERFORMANCE AND IMPROVING SERVICE EFFECTIVENESS OF GROUPS OF PRODUCTION PRINTERS

(75) Inventors: Michael Philip Kirby, Pittsford, NY (US); Nathan James Weldon, Jr., Williamson, NY (US); Timothy D. Thomas, Fairport, NY (US); Mehmet Anil Gungor, Webster, NY (US); Cheryl Marie Koenig, Ontario, NY (US); Bruce H. Smith, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 698 days.

(21) Appl. No.: 13/285,180

(22) Filed: Oct. 31, 2011

(65) Prior Publication Data

US 2013/0107313 A1  May 2, 2013

(51) Int. Cl.
*G06K 15/00* (2006.01)
*G06F 3/12* (2006.01)

(52) U.S. Cl.
CPC ............ *G06F 3/1203* (2013.01); *G06F 3/1229* (2013.01); *G06F 3/1273* (2013.01); *G06F 3/1282* (2013.01); *G06F 3/1285* (2013.01)

(58) Field of Classification Search
USPC .............................................. 705/26; 399/10
See application file for complete search history.

(56) References Cited

U.S. PATENT DOCUMENTS

| | | | |
|---|---|---|---|
| 6,032,004 A | 2/2000 | Mirabella, Jr. et al. | |
| 6,970,804 B2* | 11/2005 | Siegel et al. | 702/182 |
| 7,164,440 B2* | 1/2007 | Cannon | 348/229.1 |
| 7,418,366 B2 | 8/2008 | Tonack et al. | |
| 2003/0128991 A1 | 7/2003 | Carling et al. | |
| 2004/0078277 A1* | 4/2004 | Gindlesperger | 705/26 |
| 2004/0215468 A1 | 10/2004 | Doeberl et al. | |
| 2004/0246520 A1* | 12/2004 | Obert | 358/1.15 |
| 2005/0162681 A1* | 7/2005 | Ng et al. | 358/1.14 |
| 2006/0036344 A1 | 2/2006 | Liu et al. | |
| 2007/0038532 A1 | 2/2007 | Vyas | |
| 2007/0073772 A1 | 3/2007 | Blue et al. | |
| 2007/0150329 A1* | 6/2007 | Brook et al. | 705/8 |
| 2009/0274342 A1* | 11/2009 | Wu et al. | 382/112 |
| 2010/0039467 A1* | 2/2010 | Walmsley | 347/12 |
| 2010/0094594 A1* | 4/2010 | Yamashita et al. | 702/184 |
| 2010/0134541 A1* | 6/2010 | Walmsley | 358/1.15 |
| 2010/0145647 A1 | 6/2010 | Bouchard et al. | |
| 2010/0277531 A1* | 11/2010 | Silverbrook | 347/12 |
| 2010/0321709 A1* | 12/2010 | Eastman | 358/1.13 |
| 2011/0004419 A1* | 1/2011 | Ue et al. | 702/181 |
| 2012/0008166 A1* | 1/2012 | Noto et al. | 358/1.15 |

* cited by examiner

*Primary Examiner* — Nicholas Pachol
(74) *Attorney, Agent, or Firm* — Gibb & Riley, LLC (57) ABSTRACT

Method and systems maintain historical printing device information from a plurality of printing devices, maintain historical actions performed on the printing devices, and maintain historical print image quality produced by the printing devices within a storage medium of a computerized device. These methods and systems determine which of the historical actions increase the print image quality and which of the historical actions decrease the print image quality, using the computerized device. The methods and systems output an action effectiveness report from the computerized device. The action effectiveness report indicates which of the historical actions increase/decrease the print image quality.

18 Claims, 5 Drawing Sheets

EVALUATING AND MANAGING IMAGE QUALITY PERFORMANCE AND IMPROVING SERVICE EFFECTIVENESS OF GROUPS OF PRODUCTION PRINTERS

BACKGROUND

Embodiments herein generally relate to systems and methods that help managers maintain high image quality printing, while reducing maintenance costs by producing an action effectiveness report that indicates which of many historical actions increase/decrease print image quality, and such systems and methods can alter the recommended maintenance schedules separately for each different demographic groups of printing devices based on the historical actions that increase/decrease print image quality.

Modern production management software typically records and presents to a print shop manager information about the production of the machine, or operating conditions of the machine. This approach can sometimes fail to communicate information about image quality, or communicate in such a way that the resulting action is often costly because of unnecessary service calls or excessive parts swapping by the customer.

Further, production management systems allow a manager to monitor the production process and determine if the equipment is running at peak performance. This is done largely by communicating various meters per unit time to the central production monitoring application. The print shop manager can evaluate the throughput and effectiveness of the printing device in terms of the number of sheets delivered.

This type of monitoring assumes is that if a sheet is produced by the printing device, it is a properly printed sheet. Sometimes a successfully produced sheet is not produced due to image quality issues on the printing device. An alternative to this type of monitoring is to send up low-level device information on the effectiveness of the printing process (for example, sending the toner age, or electrical properties of the photo receptor belt). Unfortunately this type of reporting requires the production manager or operators to estimate the image quality health of the machine.

The operator may evaluate the actual image quality of the printing device and determine that it is acceptable for that particular job, paper, and customer. But the low-level device data (e.g. toner age, or electrostatic properties of transfer) might indicate that the printing device is operating in a state where image quality defects are possible. If this information is presented to the customer, the natural outcome is to replace parts (e.g., the photoreceptor belt, or other costly components) which may be unnecessary to maintain a desired level of image quality.

SUMMARY

Exemplary methods herein provide more useful printer information and more appropriate maintenance schedules. More specifically, methods herein maintain recommended maintenance schedules for a plurality of printing devices, maintain historical printing device information from the printing devices, maintain historical actions performed on the printing devices, and maintain historical print image quality produced by the printing devices within, for example, the non-transitory storage medium of one or more computerized devices. The historical printing device information comprises printing component age, printing component usage, printing component condition, types of printing actions performed, and types of document processing actions performed. The historical actions can be printing component replacement and printer maintenance actions.

These methods group the printing devices into different demographic groups of printing devices. The demographic groups of printing devices are distinguished from one another according to types of printing actions performed and types of document processing actions performed by the printing devices.

Further, methods herein determine which of the historical actions increase the print image quality and which of the historical actions decrease the print image quality separately for each of the demographic groups of printing devices using, for example, a computerized device. These methods can also determine the effect that non-performance of potential printing component replacement and printer maintenance actions have on print image quality produced by the printing devices, using the computerized device. In addition, these methods can determine the current cost of each of the historical actions in terms of the price of the components and the cost of a service to perform the service.

Additionally, such methods can output an action effectiveness report separately for each of the demographic groups of printing devices from the computerized device. The action effectiveness report indicates which of the historical actions increase the print image quality and which of the historical actions decrease the print image quality for each of the demographic groups. The action effectiveness report can further indicate which of the non-performance of potential printing component replacement and printer maintenance actions increase the print image quality and which of the non-performance of potential printing component replacement and printer maintenance actions decrease the print image quality. Additionally, the action effectiveness report can display the cost of each historical action to provide cost/benefit information of the historical actions.

Further, these methods can also maintain historical printing component failure information separately for each of the different demographic groups and alter the recommended maintenance schedules separately for each of the demographic groups of printing devices based on which of the historical actions increase the print image quality and which of the historical actions decrease the print image quality for each of the demographic groups the printing component failure information and/or the recommended maintenance schedules are altered to increase the time between service actions/part replacement where appropriate to reduce overall service costs.

Various exemplary system embodiments herein include at least one non-transitory storage medium of at least one computerized device. The computerized device is in communication with a plurality of potentially diverse printing devices. The non-transitory storage medium maintains and recommends maintenance schedules for the printing devices, historical printing device information from the printing devices, historical actions performed on the printing devices, and historical print image quality produced by the printing devices.

Further, at least one processor is operatively connected to the non-transitory storage medium. The processor groups the printing devices into different demographic groups of printing devices, and the processor determines which of the historical actions increase the print image quality and which of the historical actions decrease the print image quality separately for each of the demographic groups of printing devices. The processor can further determine the effect that non-performance of potential printing component replacement and printer maintenance actions have on print image quality produced by the printing devices. In addition, the processor can determine the current cost of each of the historical actions in terms of the price of the components and the cost of a service to perform the service. The processor can also alter the recommended maintenance schedules separately for each of the demographic groups of printing devices based on the component failure information and/or which of the historical actions increase the print image quality and which of the historical actions decrease the print image quality for each of the demographic groups. The recommended maintenance schedules are altered to increase the time between service actions/part replacements where appropriate to reduce overall service costs.

Also, at least one interface is operatively connected to the processor. The interface outputs an action effectiveness report separately for each of the demographic groups of printing devices from the computerized device. Again, the action effectiveness report indicates which of the historical actions increase the print image quality and which of the historical actions decrease the print image quality for each of the demographic groups. The action effectiveness report can also indicate which of the non-performance of potential printing component replacement and printer maintenance actions increase the print image quality and which of the non-performance of potential printing component replacement and printer maintenance actions decrease the print image quality. Additionally, the action effectiveness report can display the cost of each historical action to provide cost/benefit information of the historical actions.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

This disclosure presents production management systems that communicate service information related to the service requirements of a printing device and high frequency service items (HFSI) status for the customer replaceable components. With the systems and methods herein, the set of service actions and subsequent performance of the printing device can be provided to the customer and service personnel in the field allowing them to adjust service procedures to optimize for both service costs and operational performance. This communicates image quality health in terms of customer service actions, rather than service engineer service actions. Further, embodiments herein can do this across a fleet of machines at a variety of levels (site, account, district, etc.).

This allows the customer to evaluate both the actual image quality of the machine and their own availability to invest time in correcting the problem. Furthermore, the methods and systems herein can increase (but not decrease) the durations between service actions that extend parts life and still achieve image quality that is acceptable. The systems and methods herein allow the customer and service engineer to manage the service actions made to a device to optimize the parts replacement to meet the customer's image quality requirements for their specific demographics. This can also increase the time between parts replacement.

Because printing devices are connected to multiple servers at various levels (local site, account, district, company), and each printing device is tagged with a set of operational parameters (i.e., stock usage, volume usage, environment, area coverage, image quality tolerance) the methods and systems herein allow the customer and service engineer to compare the operational performance of their individual printing device against a variety of groups of other printers that have similar operating parameters.

The methods and systems herein send the diagnostic session log (a log of all service engineer and customer service actions performed on the printing device), and HFSI log (a log of all High Frequency Service Items and their current counters and thresholds) to a production management server. In addition, the printing device sends demographic information on job production to help identify critical parameters in service actions and customer use of the printing device to help optimize parts usage. The server then aggregates key information against a database of service actions and durations. The database downloads aggregate device factors from a server, compares the service actions with similar fleets of machines, and makes recommendations of service actions to decrease service costs. The comparison can be made at a variety of levels. Thus, the methods and systems herein can accommodate the flow of service and production information. This allows various clients to look at aggregated information at each level, and for the systems to propagate summary information down to the next level.

More specifically, the various methods and systems herein provide instructions to production printing devices to send up data incrementally across periodic triggers. This data can be sent incrementally, to avoid repeating data on each send operation (to minimize transfers). Further, this data contains service data, image quality data, and HFSI data, and demographic data containing job characteristics.

The methods and systems herein receive data from devices and perform an analysis on the data. Each printing device is characterized into a set of pre-defined demographic categories that allow the printing device to be compared with general population (or a sub-grouping a given population). The demographic categories can be user defined, or derived from demographic printing data. The demographic categories can be spaced over various lengths of time (e.g., a device may run a set of high area-coverage, heavy stock over a 2 week period). Placing a machine in different demographic categories may change the machine's service profile, resulting in different service procedures. The methods and systems herein compare the performance of the printing device to the performance of devices that are similar in printing demographics (including, but not limited to: stock type, stock size, volume, area coverage, environment, image quality tolerance, etc.). The systems and methods herein use this information to make recommendations on service actions or procedures that have been shown to improve the performance of machines (e.g., a recommendation could be: "80% of machines in demographic 1 that have a better image quality that your printing devices perform wire cleaning at least once a day. You perform wire cleaning only once a week").

Also, the methods and systems herein allow the customer to configure expanded HFSI service intervals that, while exceeding general service recommendations, are considered acceptable to the print shop. The methods and systems herein also specify key service actions that may be detrimental to the image quality of the printing device and flag them for notification when they are performed (or not performed). The methods and systems herein further specify sequences of service actions that should be performed together or in sequence (e.g., after replacing the photoreceptor belt, there is a need to run specific setups). The methods and systems herein can additionally evaluate the service actions and related downtime and compare that across other machines in a print shop, and evaluate the service actions and related downtime and compare that across machines in the country that have similar characteristics.

Additionally, the methods and systems herein maintain a database of service actions and related information that allows the system to evaluate performed actions and data to make recommendations to the user. The database is independently updatable by the user or printer manufacturer in response to updated information about the serviceability of the machine.

The methods and systems herein allow the service engineer to evaluate the customer's maintenance activity against other machines in the district, and set triggers and recommendations so that when certain maintenance procedures are performed too frequently (e.g. replacing parts early), or too infrequently the system will notify the production manager that unnecessary or necessary service may not be occurring. The methods and systems herein also make adjustments in HFSI intervals that allow customer maintenance to occur more quickly than recommended. Sometimes more frequent parts replacement or cleaning will save more expensive service engineer service visits at a later time.

Thus, methods and systems herein allows manufacturing to evaluate the performance of individual parts based on parts usage, replacement, and various demographic factors (like paper type, image quality tolerance, etc). Further, the methods and systems herein can make recommendations based on actual replacements among the fleet of machines being monitored. For example, the replacement of the photoreceptor belt may be something that is left up to the operator, but the print shop manager will record information about how often the belt is replaced. When the belt is replaced significantly before the fleet average, an indicator on the production management screen provides the shop manager with information that a service action may be taking place unnecessarily early.

Further, the methods and systems herein also make recommendations based on actual replacements among the fleet, or a subset of the fleet based on runtime parameters (e.g., all machines in the fleet that run about the same volume, stock, and size paper). The methods and systems herein contain notification services to provide feedback to operators, print shop managers, and other support personnel (including service technicians). This notification can occur via e-mail, pager, text message, or other electronic means.

Again, the methods and systems herein also encourage the customer on the key service actions that they can perform and use HFSI minimum thresholds as a way of preventing unnecessary replacement of parts. The methods and systems herein therefore identify key service actions that contribute to positive image quality, and flag these items when they have not been done at a frequency consistent maintaining high image quality. The methods and systems herein identify HFSIs that impact image quality that have not been replaced per the specified threshold, and identify key non-volatile memory (NVM) locations that are out of range, or whose values are known to cause image quality defects.

The methods and systems herein allow the user to configure expanded HFSI service intervals that, while exceeding general service recommendations, are considered acceptable to the print shop, specify key service actions that may be detrimental to the image quality of the printing device and flag them for notification when they are performed (or not performed), and specify sequences of service actions that should be performed together or in sequence (e.g., after replacing the photoreceptor belt, you need to run specific setups).

Thus, in one example, the printing device sends data to the print shop management software. The print shop management software provides a web page to the shop manager. When refreshed, the print shop management software identifies the set of critical service actions performed in the last 3 shifts and displays them, overlaid on top of production data. This allows the shop manager to see the relationship between service actions and machine downtime. The print shop management software reads the data that was transmitted to it, and looks up the expected frequencies and service actions in the database of service actions. The print shop management software also highlights service actions that are flagged as good, and indicates in a noticeable color those actions that are considered a problem to the image quality of the printing device. Service actions that have not been performed are noted on the side of the productivity indicator. This approach improves the customers experience as well as minimizing unnecessary service calls.

Figure 1:
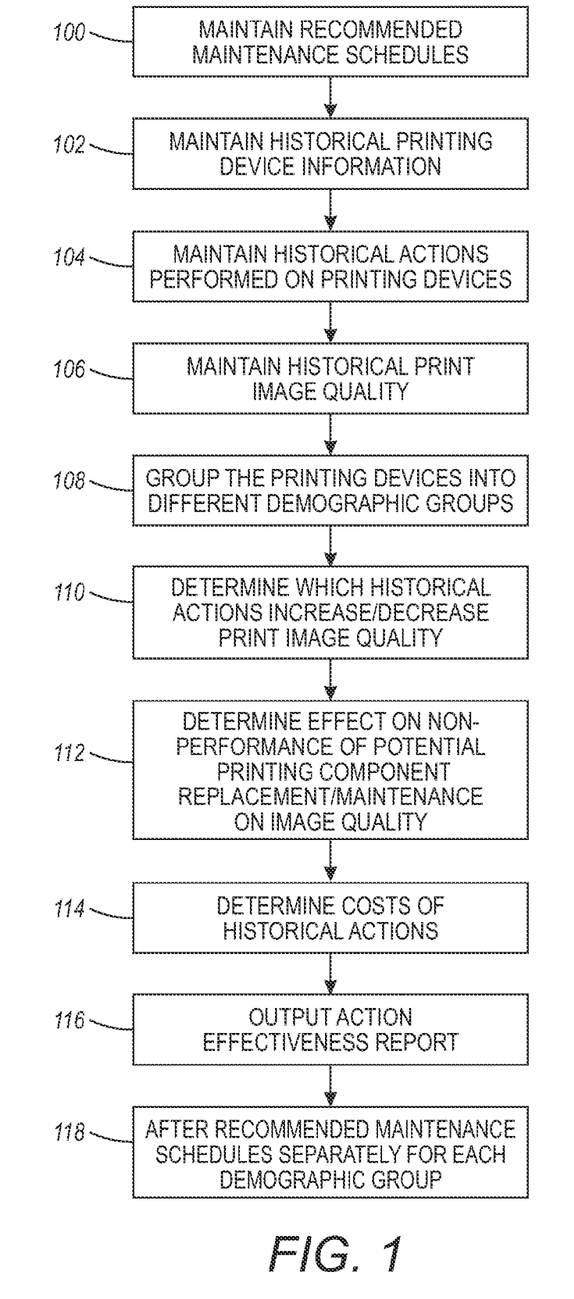
FIG. 1 is a flow diagram illustrating various method embodiments herein.

FIG. 1 is flowchart illustrating exemplary methods herein that provide more useful printer information and more appropriate maintenance schedules. Beginning in item 100, these exemplary methods maintain recommended maintenance schedules for a plurality of printing devices, in item 102 request, receive, and maintain historical printing device information from the plurality of printing devices, in item 104 request, receive, and maintain historical actions performed on the printing devices, and in item 106 request, receive, and maintain historical print image quality produced by the printing devices within, for example, a non-transitory storage medium of one or more computerized devices (e.g., within a database).

The historical printing device information comprises printing component age, printing component usage, printing component condition, types of printing actions performed, and types of document processing actions performed. The historical actions can be printing component replacement and printer maintenance actions. Again, the printing devices are connected to multiple servers at various levels (local site, account, district, company), and each printing device is tagged with a set of operational parameters (i.e., stock usage, volume usage, environment, area coverage, image quality tolerance) to allow such information to be obtained and maintained. Also, the methods and systems herein maintain a database of service actions and related information that allows the system to evaluate performed actions and data to make recommendations to the user. The database is independently updatable by the user or printer manufacturer in response to updated information about the serviceability of the machine.

In item 108, these methods group the printing devices into different demographic groups of printing devices. The demographic groups of printing devices are distinguished from one another according to types of printing actions performed and types of document processing actions performed by the printing devices. Again, each printing device is characterized into a set of pre-defined categories that allow the printing device to be compared with general population. The categories can be user defined, or derived from demographic printing data. The categories can be spaced over various lengths of time (e.g., a device may run a set of high area-coverage, heavy stock over a 2 week period). Placing a machine in different categories may change the machine's service profile, resulting in different service procedures.

Further, as shown in item 110, these methods determine which of the historical actions increase the print image quality and which of the historical actions decrease the print image quality separately for each of the demographic groups of printing devices using, for example, a computerized device. In item 112, these methods can also determine the effect that non-performance of potential printing component replacement and printer maintenance actions has on print image quality produced by the printing devices, using the computerized device. In item 114, these methods can determine the current cost of each of the historical actions in terms of the price of the components and the cost of a service to perform the service.

Additionally, such methods can output an action effectiveness report from the computerized device in item 116. An action effectiveness report can be output separately for each of the demographic groups of printing devices in item 116. The action effectiveness report indicates which of the historical actions increase the print image quality and which of the historical actions decrease the print image quality for each of the demographic groups. The action effectiveness report can further indicate which of the non-performance of potential printing component replacement and printer maintenance actions increase the print image quality and which of the non-performance of potential printing component replacement and printer maintenance actions decrease the print image quality. Additionally, the action effectiveness report can display the cost of each historical action to provide cost/benefit information of the historical actions.

Further, in item 118, these methods can also maintaining historical printing component failure information separately for each of the different demographic groups and alter the recommended maintenance schedules separately for each of the demographic groups of printing devices based on such printing component failure information and/or which of the historical actions increase the print image quality and which of the historical actions decrease the print image quality for each of the demographic groups. The recommended maintenance schedules are altered to increase the time between service actions/part replacements where appropriate to reduce overall service costs.

Figure 2:
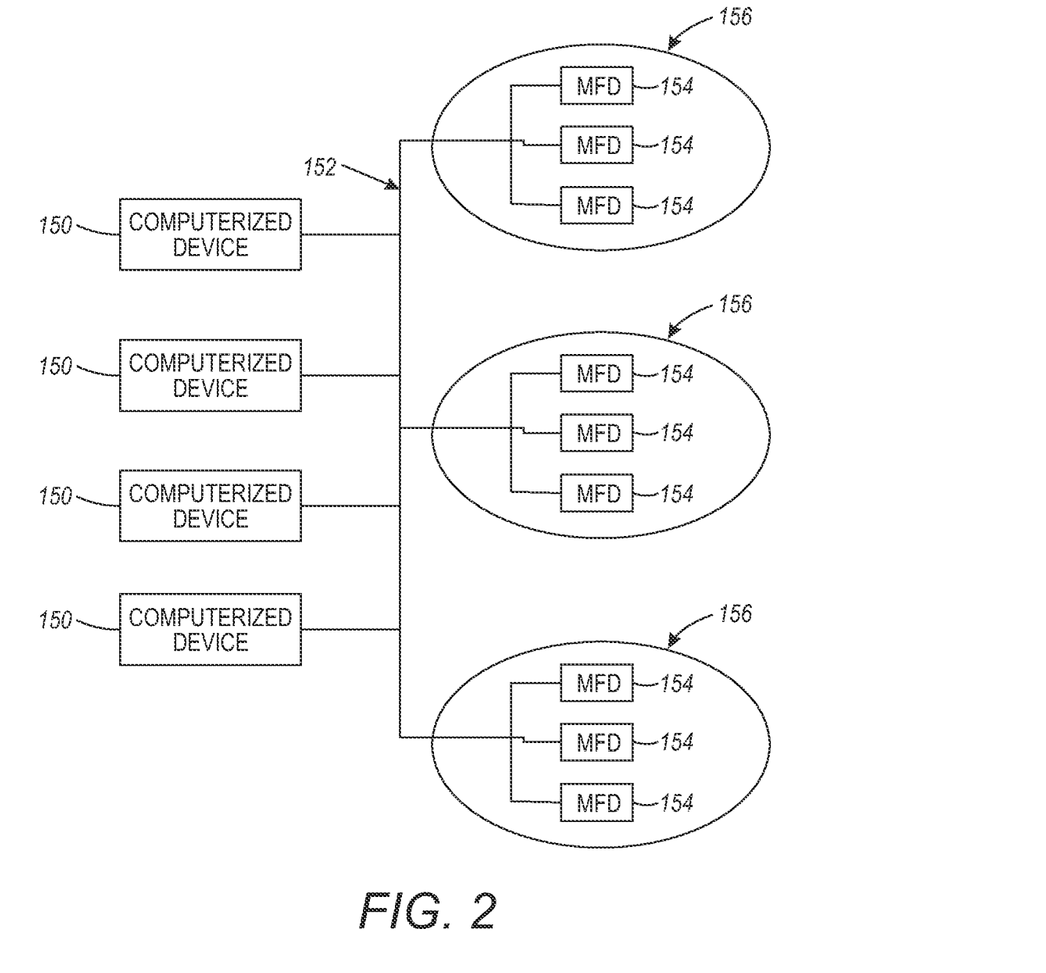
FIG. 2 is a schematic system diagram illustrating various system embodiments herein.
Figure 3:
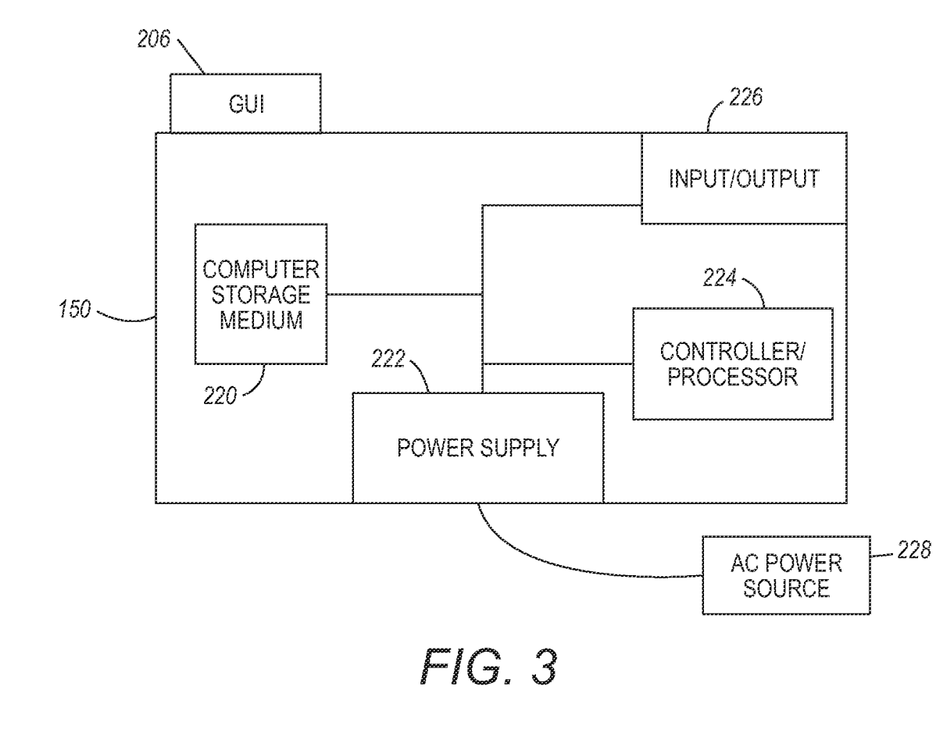
FIG. 3 is a schematic device diagram illustrating various device embodiments herein.
Figure 4:
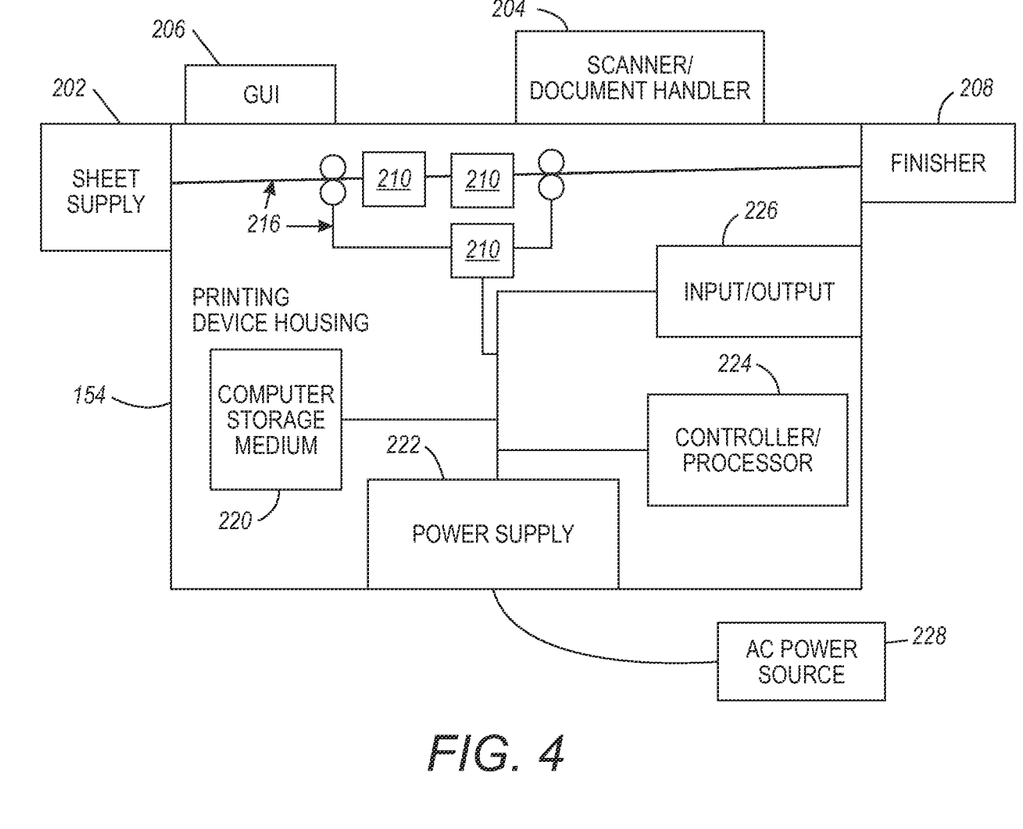
FIG. 4 is a schematic printing device diagram illustrating various printing device embodiments herein.

Various exemplary system embodiments herein (shown in FIG. 2) include at least one non-transitory storage medium 220 of at least one computerized device 150, 154 (shown in FIGS. 3-4). The computerized device 150 is in communication with a plurality of potentially diverse printing devices 154 by way of a wide area or local area network 152. As shown in FIG. 2, many different locations 156 can maintain multiple printing devices 154. As mentioned above, the printing devices are connected to multiple servers at various levels (local site, account, district, company), and each printing device is tagged with a set of operational parameters (i.e., stock usage, volume usage, environment, area coverage, image quality tolerance) to allow such information to be obtained and maintained. The database is independently updatable by the user or printer manufacturer in response to updated information about the serviceability of the machine.

Each of these different locations 156 can be a different division of a company (printing machines maintained on different floors of the building or different geographic locations operated by a given company). Alternatively, items 156 can represent distinct and different companies (site, account, district, etc). Further, items 156 can represent groupings of many unrelated individual printers, each of which is operated by individual managers/owners. In addition, many of the computerized devices 150 may be virtual devices (cloud devices), may be managed/owned by entities different than the entities associated with the different locations 156, may be different computers located at the different locations 156, etc.

The non-transitory storage medium 220 shown in FIGS. 3-4 maintains recommended maintenance schedules for the printing devices 154, historical printing device information from the printing devices 154, historical actions performed on the printing devices 154, and historical print image quality produced by the printing devices 154.

Further, the processor 224 is operatively connected to the non-transitory storage medium 220, and the processor 224 groups the printing devices 154 into different demographic groups of printing devices 154. Again, the demographic groups of printing devices are distinguished from one another according to types of printing actions performed and types of document processing actions performed by the printing devices.

The processor 224 also determines which of the historical actions increase the print image quality and which of the historical actions decrease the print image quality separately for each of the demographic groups of printing devices 154. The processor 224 can further determine the effect that non-performance of potential printing component replacement and printer maintenance actions have on print image quality produced by the printing devices 154. In addition, the processor 224 can determine the current cost of each of the historical actions in terms of the price of the components and the cost of a service to perform the service. The processor 224 can also maintain historical printing component failure information separately for each of the different demographic groups and alter the recommended maintenance schedules separately for each of the demographic groups of printing devices 154 based on printing component failure information and/or which of the historical actions increase the print image quality and which of the historical actions decrease the print image quality for each of the demographic groups. The recommended maintenance schedules are altered to increase the time between service actions/part replacements where appropriate to reduce overall service costs.

Also, at least one interface 206, 226 is operatively connected to the processor 224. The interface 206, 226 outputs an action effectiveness report separately for each of the demographic groups of printing devices 154 from the computerized device 150.

Figure 5:
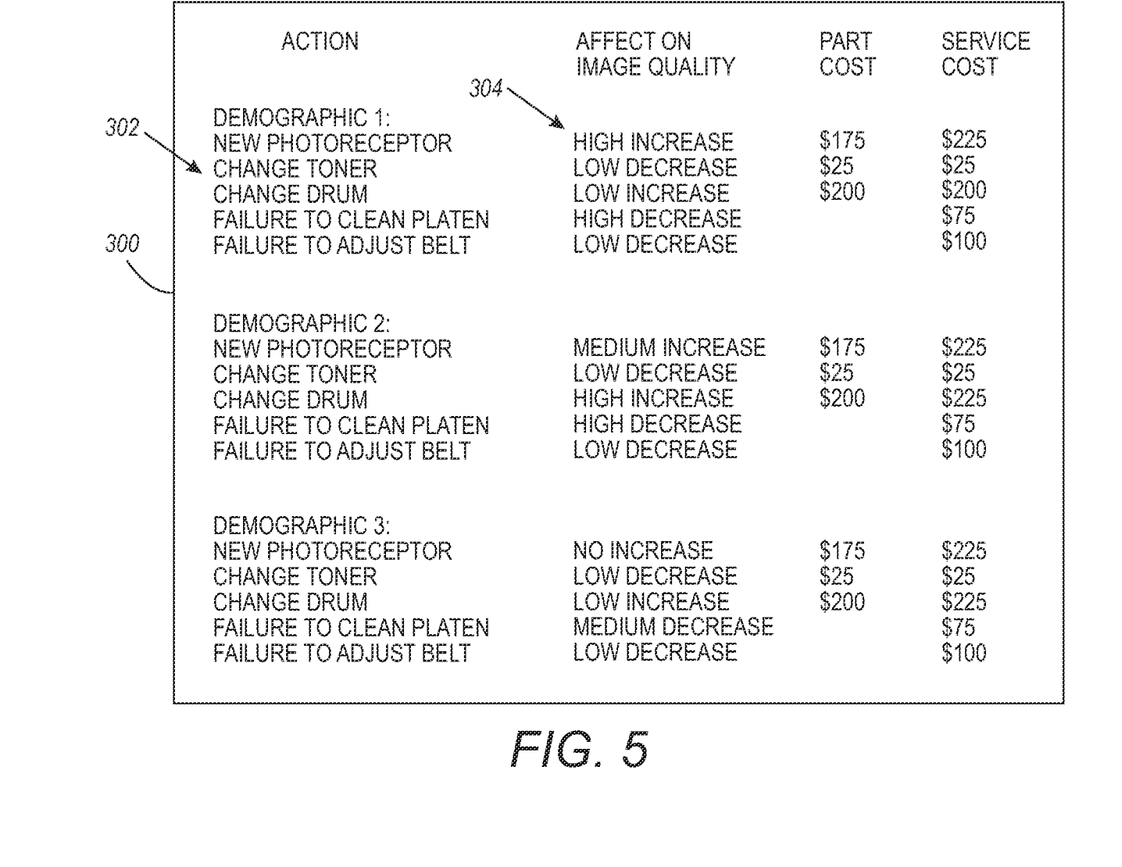
FIG. 5 is a schematic device diagram illustrating an exemplary report produced by embodiments herein.

An exemplary action effectiveness report 300 is shown in FIG. 5. Those ordinarily skilled in the art would understand that the report 300 shown in FIG. 5 is only one example and that each report would be crafted to meet the specific needs of each different situation. The exemplary action effectiveness report 300 shown in FIG. 5 indicates which of the historical actions 302 increase/decrease the print image quality 304. Further, as shown in FIG. 5, the historical actions that increase/decrease the print image quality can be different for different demographic groups (groups 1-3). The action effectiveness report 300 can also indicate which of the non-performance of potential printing component replacement and printer maintenance actions (failure to clean platen or adjust a belt) increase/decrease the print image quality. Additionally, the action effectiveness report can display the cost of each historical action to provide cost/benefit information of the historical actions.

FIGS. 3-4 illustrate exemplary some details of the exemplary computerized device 150 and multi-function printing device 154, shown in FIG. 2. More specifically, these devices can respectively comprise stand-alone computers, terminals/mainframe systems, portable computing devices, printers, copiers, multi-function machines, etc. The computerized device 150 and printing device 154 can include similar components (which are given the same identifying numbers) although the same components within the two different devices 150, 154 could have different functioning characteristics to match the overall different function of the each of the printing devices 150, 154.

The input/output device 226 is used for communications to and from the printing devices 150, 154. The processor 224 controls the various actions of the printing devices. A non-transitory computer storage medium device 220 (which can be optical, magnetic, capacitor based, etc.) is readable by the processor 224 and stores instructions that the processor 224 executes to allow the multi-function printing device to perform its various functions, such as those described herein. Thus, the various device housings have one or more functional components that operate on power supplied from the alternating current (AC) 228 by the power supply 222. The power supply 222 connects to an external alternating current power source 228 and converts the external power into the type of power needed by the various components.

The multi-function printing device 154 can include items such at least one marking device (printing engines) 210 operatively connected to the processor 224, a media path 216 positioned to supply sheets of media from a sheet supply 202 to the marking device(s) 210, and a communications port (input/output) 226 operatively connected to the processor 224 and to a computerized network external to the printing device. After receiving various markings from the printing engine(s), the sheets of media can optionally pass to a finisher 208 which can fold, staple, sort, etc., the various printed sheets. Also, the printing device 154 can include at least one accessory functional component (such as a scanner/document handler 204, sheet supply 202, finisher 208, etc.) and graphic user interface assembly 206 that also operate on the power supplied from the external power source 228 (through the power supply 222).

As would be understood by those ordinarily skilled in the art, the printing devices 150, 154 shown in FIG. 3-4 are only limited examples and the embodiments herein are equally applicable to other types of devices that may include fewer components or more components.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method comprising:
   maintaining historical printing device information from a plurality of printing devices within a non-transitory storage medium of a computerized device;
   maintaining historical service actions performed on said printing devices within said non-transitory storage medium of said computerized device, said historical service actions comprising printing component replacement and printer maintenance actions;
   maintaining historical print image quality produced by said printing devices within said non-transitory storage medium of said computerized device;
   determining which of said historical service actions increase said print image quality and which of said historical service actions decrease said print image quality, using said computerized device;
   determining costs of each of said historical service actions, said costs comprising prices of components of said printing device and a cost to perform service on said printing device; and
   outputting an action effectiveness report from said computerized device, said action effectiveness report including said costs of said historical service actions and indicating which of said historical service actions increase said print image quality and which of said historical service actions decrease said print image quality to provide cost/benefit information of said historical service actions.

2. The method according to claim 1, said historical printing device information comprising printing component age, printing component usage, printing component condition, types of printing actions performed, and types of document processing actions performed.

3. The method according to claim 1, further comprising determining an effect that non-performance of potential printing component replacement and printer maintenance actions have on print image quality produced by said printing devices, using said computerized device.

4. The method according to claim 3, said action effectiveness report further indicating which of said non-performance of potential printing component replacement and printer maintenance actions increase said print image quality and which of said non-performance of potential printing component replacement and printer maintenance actions decrease said print image quality.

5. A method comprising:
maintaining recommended maintenance schedules for a plurality of printing devices within a non-transitory storage medium of a computerized device;
grouping said printing devices into different demographic groups of printing devices, using said computerized device;
maintaining historical printing component failure information separately for each of said different demographic groups, within said non-transitory storage medium of said computerized device;
maintaining historical service actions performed on said printing devices within said non-transitory storage medium of said computerized device, said historical service actions comprising printing component replacement and printer maintenance actions; and
altering said recommended maintenance schedules separately for each of said demographic groups of printing devices based on said component failure information,
said altering of said recommended maintenance schedules increasing a time between service actions to reduce overall service costs, said overall service costs comprising prices of components of said printing device and a cost to perform service on said printing device.

6. The method according to claim 5, said demographic groups of printing devices being distinguished from one another according to types of printing actions performed and types of document processing actions performed by said printing devices.

7. The method according to claim 5, further comprising maintaining historical printing device information comprising printing component age, printing component usage, printing component condition, types of printing actions performed, and types of document processing actions performed.

8. The method according to claim 5, further comprising determining an effect that non-performance of potential printing component replacement and printer maintenance actions have on print image quality produced by said printing devices, using said computerized device.

9. A method comprising:
maintaining recommended maintenance schedules for a plurality of printing devices within a non-transitory storage medium of a computerized device;
maintaining historical printing device information from said printing devices within said non-transitory storage medium of said computerized device;
maintaining historical service actions performed on said printing devices within said non-transitory storage medium of said computerized device, said historical service actions comprising printing component replacement and printer maintenance actions;
grouping said printing devices into different demographic groups of printing devices, using said computerized device;
maintaining historical print image quality produced by said printing devices, using said computerized device;
maintaining historical printing component failure information separately for each of said different demographic groups within said non-transitory storage medium of said computerized device;
determining which of said historical service actions increase said print image quality and which of said historical service actions decrease said print image quality separately for each of said demographic groups of printing devices, using said computerized device;
determining costs of each of said historical service actions, said costs comprising prices of components of said printing device and a cost to perform service on said printing device;
outputting an action effectiveness report separately for each of said demographic groups of printing devices from said computerized device, said action effectiveness report including said costs of said historical service actions and indicating which of said historical service actions increase said print image quality and which of said historical service actions decrease said print image quality for each of said demographic groups to provide cost/benefit information of said historical service actions; and
altering said recommended maintenance schedules separately for each of said demographic groups of printing devices based on said component failure information,
said altering of said recommended maintenance schedules increasing a time between service actions to reduce overall service costs.

10. The method according to claim 9, said historical printing device information comprising printing component age, printing component usage, printing component condition, types of printing actions performed, and types of document processing actions performed.

11. The method according to claim 9, further comprising determining an effect that non-performance of potential printing component replacement and printer maintenance actions have on print image quality produced by said printing devices, using said computerized device.

12. The method according to claim 11, said action effectiveness report further indicating which of said non-performance of potential printing component replacement and printer maintenance actions increase said print image quality and which of said non-performance of potential printing component replacement and printer maintenance actions decrease said print image quality.

13. The method according to claim 9, said demographic groups of printing devices being distinguished from one another according to types of printing actions performed and types of document processing actions performed by said printing devices.

14. A system comprising:
at least one non-transitory storage medium of at least one computerized device, said computerized device being in communication with a plurality of printing devices, said non-transitory storage medium maintaining recommended maintenance schedules for said printing devices, historical printing device information from said printing devices, historical service actions performed on said printing devices, historical print image quality produced by said printing devices, and historical printing component failure information separately for each a plurality of different demographic groups of printing devices, said historical service actions comprising printing component replacement and printer maintenance actions;

at least one processor operatively connected to said non-transitory storage medium, said processor grouping said printing devices into said different demographic groups, said processor determining which of said historical service actions increase said print image quality and which of said historical service actions decrease said print image quality separately for each of said demographic groups of printing devices, and said processor determining costs of each of said historical service actions, said costs comprising prices of components of said printing device and a cost to perform service on said printing device; and at least one interface operatively connected to said processor, said interface outputting an action effectiveness report separately for each of said demographic groups of printing devices from said computerized device, said action effectiveness report including said costs of said historical service actions and indicating which of said historical service actions increase said print image quality and which of said historical service actions decrease said print image quality for each of said demographic groups to provide cost/benefit information of said historical service actions, said processor altering said recommended maintenance schedules separately for each of said demographic groups of printing devices based on said component failure information, and said altering of said recommended maintenance schedules increasing a time between service actions to reduce overall service costs.

15. The system according to claim 14, said historical printing device information comprising printing component age, printing component usage, printing component condition, types of printing actions performed, and types of document processing actions performed.

16. The system according to claim 14, said processor determining an effect that non-performance of potential printing component replacement and printer maintenance actions have on print image quality produced by said printing devices.

17. The system according to claim 16, said action effectiveness report further indicating which of said non-performance of potential printing component replacement and printer maintenance actions increase said print image quality and which of said non-performance of potential printing component replacement and printer maintenance actions decrease said print image quality.

18. The system according to claim 14, said demographic groups of printing devices being distinguished from one another according to types of printing actions performed and types of document processing actions performed by said printing devices.

* * * * *